United States Patent [19]

Kluttz

[11] Patent Number: 4,988,754
[45] Date of Patent: Jan. 29, 1991

[54] STABILIZED COMPOSITIONS

[75] Inventor: Robert Q. Kluttz, Houston, Tex.

[73] Assignee: Shell Oil Company, Houston, Tex.

[21] Appl. No.: 373,317

[22] Filed: Jun. 27, 1989

[51] Int. Cl.$^5$ .................................................. C08K 5/08
[52] U.S. Cl. .................................................... 524/358
[58] Field of Search ................. 524/358; 528/392; 526/208

[56] References Cited

U.S. PATENT DOCUMENTS

| | | | |
|---|---|---|---|
| 3,694,412 | 9/1972 | Nozaki | 260/63 |
| 3,929,727 | 12/1975 | Russell et al. | 260/45.95 F |
| 4,024,104 | 5/1977 | Russell et al. | 260/45.8 R |
| 4,042,764 | 8/1977 | Gratani et al. | 524/358 |
| 4,056,665 | 11/1977 | Taylor et al. | 524/358 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 0257663 | 3/1988 | European Pat. Off. . |
| 257663 | 3/1988 | European Pat. Off. . |

*Primary Examiner*—Kriellion Morgan

[57] ABSTRACT

Linear alternating polymers of carbon monoxide and at least one ethylenically unsaturated hydrocarbon are stabilized against degradation caused by exposure to elevated temperatures by the inclusion therein of an alkylated benzoquinone.

19 Claims, No Drawings

STABILIZED COMPOSITIONS

FIELD OF THE INVENTION

This invention relates to certain stabilized compositions comprising linear alternating polymers of carbon monoxide and at least one ethylenically unsaturated hydrocarbon. More particularly, the invention relates to such compositions stabilized against the detrimental effect of exposure to elevated temperatures by the incorporation therein of certain benzoquinone thermal stabilizers.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.S. Pat. No. 1,081,304 produced similar polymers of somewhat higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. More recent processes for the production of such polymers, now becoming known as polyketones or polyketone polymers, are illustrated by a number of published European Patent Applications including Nos. 121,965, 181,014, 213,671 and 257,663. The process, now considered broadly conventional, generally involves the use of a catalyst composition formed from a compound of a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having established utility as premium thermoplastics in the production of shaped articles by methods conventional for the processing of thermoplastics. Although the polyketone polymers are relatively stable, they do undergo to some degree the degradation upon exposure to elevated temperatures characteristic of most if not all organic polymers.

Russell et al, U.S. Pat. No. 3,929,727 and U.S. Pat. No. 4,024,104, teach the use of certain hindered phenolic benzophenones and benzotriazines as thermal stabilizers of certain polymers of carbon monoxide and ethylene with the optional presence of third mononers. Although the scope of the disclosure of polymers by Russell et al is rather broad including linear alternating polymers, the scope of the polymers tested is rather narrow and the Russell et al teachings do not appear to be directed to linear alternating polymers. A copending U.S. patent application, Ser. No. 382,512, filed July 20, 1989 now abandoned describes and claims the use of, inter alia, certain alkylated hydroquinones as thermal stabilizers for polyketone polymers. It would be of advantage, however, to provide additional thermal stabilizers for linear alternating polymers of carbon monoxide and at least one ethylenically unsaturated hydrocarbon.

SUMMARY OF THE INVENTION

The present invention provides polymer compositions stabilized against the detrimental effect of exposure to elevated temperature. More particularly, the invention provides polymer compositions comprising linear alternating polymer of carbon monoxide and at least one ethylenically unsaturated hydrocarbon, which compositions are stabilized against degradation caused by exposure to elevated temperature by the incorporation of certain alkylated benzoquinones.

DESCRIPTION OF THE INVENTION

The compositions of the invention comprise linear alternating polymers of carbon monoxide and at least one ethylenically unsaturated hydrocarbon thermally stabilized by the inclusion therein of an alkylated benzoquinone. The ethylenically unsaturated hydrocarbons useful as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic having an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and a second hydrocarbon are employed in the compositions of the invention, there will be within the terpolymer at least about 2 units incorporating a moiety of ethylene for each unit incorporating a moiety of the second hydrocarbon. Preferably there will be from about 10 to about 100 units incorporating a moiety of ethylene for each unit incorporating a unit of the second hydrocarbon. The polymer chain of the preferred polymers is therefore represented by the repeating formula

  (I)

wherein G is the moiety of the second hydrocarbon of at least 3 carbon atoms polymerized through the ethylenic unsaturation. The —CO—CH$_2$—CH$_2$— units and the —CO—(—G—)— units are formed randonmly throughout the polymer chain and the ratio of y:x is no more than about 0.5. In the modification of the invention where copolymers of carbon monoxide and ethylene are employed, there will be no second hydrocarbon present and the copolymers are represented by the above formula I wherein y is 0. When y is other than 0, i.e., terpolymers are employed, the preferred ratios of y:x are from about 0.01 to about 0.1. The end groups or "caps" of the polymer chain will depend upon what materials were present during the production of the polymer and whether or how the polymer was purified. The end groups do not appear to influence the overall properties of the polymer to any considerable extent so that the polymer chain is fairly represented by the polymer chain as depicted above.

Of particular interest are the polymers of number average molecular weight from about 1000 to about 200,000, particularly those polymers of number average molecular weight from about 20,000 to about 90,000, as determined by gel permeation chromatography. The physical properties of the polymers will depend in part on the molecular weight of the polymer, whether the polymer is a copolymer or a terpolymer and in the case of terpolymers the nature of and the proportion of the second hydrocarbon present. Typical melting points for such polymers are from about 175° C. to about 300° C., more frequently from about 210° C. to about 270° C. The polymers will have a limiting viscosity number (LVN), expressed in dl/g when measured in m-cresol at 60° C., of from about 0.5 to about 10, preferably from about 0.8 to about 4.

The polymers are produced by the general methods of the above published European Patent Applications. The method which is now becoming conventional is to contact the carbon monoxide and unsaturated hydrocarbon in the presence of a catalyst composition formed from a palladium compound, the anion of a non-hydrohalogenic acid having a pKa (measured in water at 18° C.) below about 6 and a bidentate ligand of phosphorus. The scope of the process for polyketone production is extensive but, without wishing to be limited, a preferred palladium compound is a palladium carboxylate, particularly palladium acetate, a preferred anion is the anion of trifluoroacetic acid or p-toluenesulfonic acid, and a preferred bidentate ligand is 1,3-bis(diphenylphosphino)propane or 1,3-bis[di(2-methoxyphenyl)-phosphino]propane.

Polymerization is conducted by contacting the reactants under polymerization conditions in the presence of the catalyst composition in a liquid reaction diluent. Lower alkanols are suitable reaction diluents, particularly methanol. Polymerization conditions include a reaction temperature from about 20° C. to about 150° C., preferably from about 50° C. to about 135° C. Typical reaction pressures are from about 1 bar to about 200 bar, but reaction pressures from about 10 bar to about 100 bar are more often utilized. Subsequent to the desired reaction, the polymerization is terminated by cooling the reactor and contents and releasing the pressure. The polymer product is substantially insoluble in the reaction diluent and is recovered by conventional methods such as filtration or decantation. The polymer is used as recovered or is purified, if desired, by contacting the polymer with a solvent or complexing agent selective for catalyst residues.

The polyketone polymers are stabilized against degradation caused by exposure to elevated temperatures by incorporating therein a stabilizing quantity of an alkylated benzoquinone having at least one secondary or tertiary alkyl group substituted on a ring carbon ortho to a quinone carbonyl group. Suitable alkyl substituents have up to 10 carbon atoms inclusive but preferably have from 3 to 5 carbon atoms inclusive. These preferred alkyl groups are illustrated by isopropyl, sec-butyl, tert-butyl, sec-amyl and tert-amyl. Both 1,2-benzoquinones and 1,4-benzoquinones are suitable and the stabilizers of the invention are illustrated by 2,6-di-t-butyl-1,4-benzoquinone, 2-i-propyl-6-sec-amyl-1,4-benzoquinone, 2,6-di-sec-butyl-1,4-benzoquinone, 2,5-di-t-amyl-1,4-benzoquinone, 3,5-di-t-butyl-1,2-benzoquinone, 3,5-di-i-propyl-1 2-benzoquinone, 3,5-di-t-amyl-1,2-benzoquinone and 3,5-di-sec-butyl-1,2-benzoquinone. The preferred benzoquinones are those in which 2 alkyl groups are the alkyl groups present which suitably are t-butyl and generally 1,2-benzoquinones are preferred over the corresponding 1,4-benzoquinones. Particularly preferred is 3,5-di-t-butyl-1,2-benzoquinone.

The alkylated benzoquinone is employed in a stabilizing quantity. Such quantities are from about 0.005% by weight to about 5% by weight, based on total composition. Amounts of benzoquinone from about 0.01% by weight to about 1% by weight of alkylated benzoquinone on the same basis are preferred. The polyketone polymer and the alkylated benzoquinone are compounded by conventional methods suitable for forming an intimate mixture o: the polymer and the thermal stabilizer. Such methods include the dry blending of the polymer and the stabilizer in a finely divided form followed by hot pressing or extrusion o: the mixture. Alternatively, the stabilized composition is formed by blending the components in a mixing device operating at high shear. The stabilized composition may also include other components such as antioxidants, colorants, plasticizers, fibers and dyes which are added together with or separately from the thermal stabilizer.

The stabilized compositions ar useful in the manufacture of sheets, films, laminates, wire and cable and other shaped objects of established utility which are produced by methods conventional for the processing of thermoplastics such as melt-spinning, extrusion, injection molding and thermoforming. The compositions of the invention find particular application where the finished article is likely to be exposed to elevated temperatures, e.g., containers for food and drink.

The invention is further illustrated by the following Illustrative Embodiments which should not be construed as limiting the invention.

ILLUSTRATIVE EMBODIMENT I

A linear alternating terpolymer 88/023] was produced in the presence of a catalyst composition formed from palladium acetate, trifluoroacetic acid and 1,3-bis[di(2-methoxyphenyl)phosphino]propane. The polymer had a melting point of 218° C. and an LVN, measured in m-cresol at 60° C. of 1.84 dl/g.

ILLUSTRATIVE EMBODIMENT II

Sample plaques of the terpolymer of Illustrative Embodiment I were produced by incorporating 0.1% by weight and 0.5% by weight, based on total composition, of candidate alkylated quinones in the terpolymer. A commercial antioxidant, AO 330, was present in each case as a background stabilizer. The stabilizers were blended with cryoground terpolymer and tumbled overnight. The mixtures were then extruded through a 15 mm Baker-Perkins twin screw extruder operating at 240° C. From the extruded compositions test plaques 0.03 inches thick were prepared by compression molding employing a slow quench.

The test plaques were placed in an oven maintained at 125° C. Periodically, test plaques were withdrawn and bent in an angle of 180 degrees. When the plaque cracked, the time to embrittlement was determined as a function of time and considered to be !he point of specimen failure. The results of this oven aging test are shown in the Table.

TABLE

| Stabilizer | Amount, % wt. | Hours to Failure |
|---|---|---|
| None | — | 160 |
| 2,6-Di-t-butyl-1,4-benzoquinone | 0.1 | 160 |
|  | 0.5 | 192 |
| 3,5-Di-t-butyl-1,2-benzoquinone | 0.1 | 200 |
|  | 0.5 | 216 |

What is claimed is:

1. A stabilized composition comprising:
a linear alternating polymer of carbon monoxide and at least one ethylenically unsaturated hydrocarbon, wherein the polymer is represented by the repeating formula

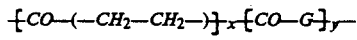

wherein G is a moiety of an ethylenically unsaturated hydrocarbon of at least 3 carbon atoms polymerized through the ethylenic unsaturation and the ratio of y:x is no more than about 0.5; and
a stabilizing quantity of an alkylated benzoquinone, wherein the benzoquinone is substituted with at least one secondary or tertiary alkyl group on a carbon atom ortho to a quinone carbonyl group.

2. A process of stabilizing a linear alliterating polymer of carbon monoxide and at least one ethylenically unsaturated hydrocarbon against thermal degradation by incorporating therein a stabilizing quantity of an alkylated benzoquinone, wherein the benzoquinone is substituted with at least one secondary or tertiary alkyl group on a carbon atom ortho to a quinone carbonyl group, and wherein the polymer is represented by the formula

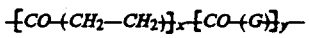

wherein G is a moiety of an ethylenically unsaturated hydrocarbon of at least 3 carbon atoms polymerized through the ethylenic unsaturation and the ratio of y:x is no more than about 0.5.

3. The composition of claim 1 wherein two secondary or tertiary alkyl groups are present in the benzoquinone and each has from 3 to 5 carbon atoms.

4. The composition of claim 3 wherein y is 0.

5. The composition of claim 4 wherein the benzoquinone is 3,5-di-t-butyl-1,2-benzoquinone.

6. The composition of claim 4 wherein the benzoquinone is 2,6-di-t-butyl-1,4-benzoquinone.

7. The composition of claim 3 wherein G is a moiety of propylene and the ratio of y:x is from about 0.01 to about 0.1.

8. The composition of claim 7 wherein the alkyl groups of the benzoquinone are t-butyl.

9. The composition of claim 7 wherein the benzoquinone is 3,5-di-t-butyl-1,2-benzoquinone.

10. The composition of claim 7 wherein the benzoquinone is 2,6-di-t-butyl-1,4-benzoquinone.

11. The process of claim 2 wherein two secondary or tertiary alkyl groups are present in the benzoquinone and each has from 3 to 5 carbon atoms.

12. The process of claim 11 wherein the quantity of the benzoquinone is from about 0.005% by weight to about 5% by weight based on total composition.

13. The process of claim 12 wherein y is 0.

14. The process of claim 13 wherein the benzoquinone is 3,5-di-t-butyl-1,2-benzoquinone.

15. The process of claim 13 wherein the benzoquinone is 2,6-di-t-butyl-1,4-benzoquinone.

16. The process of claim 12 wherein G is a moiety of propylene and the ratio of y:x is from about 0.01 to about 0.1.

17. The process of claim 16 wherein the alkyl groups of the benzoquinone are t-butyl.

18. The process of claim 16 wherein the benzoquinone is 3,5-di-t-butyl-1,2-benzoquinone.

19. The process of claim 16 wherein the benzoquinone is 2,6-di-t-butyl-1,4-benzoquinone.

* * * * *